US009076160B2

(12) United States Patent
Gu

(10) Patent No.: US 9,076,160 B2
(45) Date of Patent: Jul. 7, 2015

(54) SYSTEM AND METHOD FOR SUGGESTING RECOMMENDED KEYWORD

(75) Inventor: Dong Hyun Gu, Seongnam-si (KR)

(73) Assignee: NAVER Corporation, Seongnam-si (KR)

( * ) Notice: Subject to any disclaimer, the term of this patent is extended or adjusted under 35 U.S.C. 154(b) by 255 days.

(21) Appl. No.: 13/294,856

(22) Filed: Nov. 11, 2011

(65) Prior Publication Data

US 2012/0123855 A1    May 17, 2012

(30) Foreign Application Priority Data

Nov. 11, 2010    (KR) .......................... 10-2010-0111923

(51) Int. Cl.
G06F 17/30    (2006.01)
G06Q 30/02    (2012.01)

(52) U.S. Cl.
CPC ........ *G06Q 30/0241* (2013.01); *G06F 17/3064* (2013.01); *G06Q 30/0247* (2013.01)

(58) Field of Classification Search
CPC .............. G06Q 30/02; G06Q 30/0269; G06Q 30/0273; G06Q 30/0251; G06Q 50/01; G06Q 30/0241; G06Q 30/0255; G06Q 30/0256; G06Q 30/0277; G06Q 30/0631; G06Q 30/0247; G06Q 30/0267; G06Q 30/0242; G06F 17/3064; G06F 30/0241; G06F 30/0247
USPC ........................................... 705/14.46, 14.54
See application file for complete search history.

(56) References Cited

U.S. PATENT DOCUMENTS

| 7,181,438 | B1 * | 2/2007 | Szabo ..................................... 1/1 |
| 7,774,333 | B2 * | 8/2010 | Colledge et al. .............. 707/708 |
| 8,069,182 | B2 * | 11/2011 | Pieper ............................. 707/769 |
| 2002/0107735 | A1 * | 8/2002 | Henkin et al. .................. 705/14 |
| 2005/0108001 | A1 * | 5/2005 | Aarskog .......................... 704/10 |
| 2006/0036589 | A1 * | 2/2006 | Okuda et al. ...................... 707/3 |
| 2006/0235816 | A1 * | 10/2006 | Yang et al. ........................ 707/1 |

(Continued)

FOREIGN PATENT DOCUMENTS

| KR | 1020090001997 | 1/2009 |
| KR | 1020090011255 | 2/2009 |
| KR | 1020100009404 | 1/2010 |

OTHER PUBLICATIONS

Liu et al. (2010). Advertsing Keywords Extraction from Web Pages. WISM. LNCS 6318, pp. 336-343.*

(Continued)

*Primary Examiner* — Timothy Padot
(74) *Attorney, Agent, or Firm* — Greer Burns & Crain Ltd.

(57) ABSTRACT

Provided are a system and method of suggesting at least one recommended keyword. The recommended keyword suggestion system may include a database storage device, the system including a keyword extracting unit to extract at least one keyword associated with a certain keyword from a related search word database stored in the database storage device, a display score providing unit to provide at least one display score for the at least one extracted keyword, each of the at least one display score being associated with an expected revenue from advertisement of each of the at least one extracted keyword, and a recommended keyword determining unit to determine at least one recommended keyword to be displayed for the certain keyword among the at least one extracted keyword, based on the provided at least one display score.

7 Claims, 12 Drawing Sheets

(56) References Cited

U.S. PATENT DOCUMENTS

| | | | |
|---|---|---|---|
| 2006/0248078 A1* | 11/2006 | Gross et al. | 707/5 |
| 2007/0027901 A1* | 2/2007 | Chan et al. | 707/102 |
| 2007/0143266 A1* | 6/2007 | Tang et al. | 707/3 |
| 2007/0143693 A1* | 6/2007 | Choi et al. | 715/753 |
| 2007/0156757 A1* | 7/2007 | Tang et al. | 707/104.1 |
| 2007/0250468 A1* | 10/2007 | Pieper | 707/1 |
| 2007/0250488 A1* | 10/2007 | Lee | 707/3 |
| 2007/0288431 A1* | 12/2007 | Reitter et al. | 707/3 |
| 2008/0016040 A1* | 1/2008 | Jones et al. | 707/3 |
| 2008/0021878 A1* | 1/2008 | Jeong | 707/3 |
| 2008/0059258 A1* | 3/2008 | Lee | 705/7 |
| 2008/0065620 A1* | 3/2008 | Chopra | 707/5 |
| 2008/0183698 A1* | 7/2008 | Messer et al. | 707/5 |
| 2008/0221987 A1* | 9/2008 | Sundaresan et al. | 705/14 |
| 2008/0270167 A1* | 10/2008 | Wee et al. | 705/1 |
| 2008/0270388 A1* | 10/2008 | Wee et al. | 707/5 |
| 2008/0275783 A1* | 11/2008 | Wee et al. | 705/14 |
| 2008/0313164 A1* | 12/2008 | Lee et al. | 707/5 |
| 2009/0024718 A1* | 1/2009 | Anagnostopoulos et al. | 709/218 |
| 2010/0211454 A1* | 8/2010 | Shin et al. | 705/14.42 |
| 2011/0208596 A1* | 8/2011 | Kwon et al. | 705/14.71 |

OTHER PUBLICATIONS

Wu et al. (2009). Advertising Keyword Generation Using Active Learning. ACM. WWW Apr. 20-24, 2009. 1095-1096.*

Abhishek et al. (2007). Keyword Generation for Search Engine Advertising using Semantic Similarity between terms. ICEC Apr. 19-22. pp. 89-94.*

\* cited by examiner

| PREDETERMINED KEYWORD | RELATED KEYWORD | PPC | CTR OF AD REGION | CLICK SHARE | RESULT 1 | RESULT 2 |
|---|---|---|---|---|---|---|
| LOAN | MORTGAGE | 12,402 | 31.11007 | 38.20585 | 385,827 | 473,829 |
| LOAN | DOCTOR LOAN | 7,716 | 76.81156 | 57.53051 | 592,678 | 443,905 |
| LOAN | INTERNET CREDIT LOAN | 7,240 | 69.32584 | 60.15632 | 501,919 | 435,532 |
| LOAN | INTERNET LOAN | 7,892 | 59.39849 | 52.39891 | 468,773 | 413,532 |
| LOAN | LOAN COMPANY | 6,595 | 64.88961 | 58.83004 | 427,947 | 387,984 |
| LOAN | SMALL LOAN | 7,620 | 58.06759 | 46.71769 | 442,475 | 355,989 |
| LOAN | FAST LOAN | 7,837 | 51.45489 | 45.32739 | 403,252 | 355,231 |
| LOAN | LOAN COUNSEL | 9,319 | 34.10153 | 36.75205 | 317,792 | 342,492 |
| LOAN | SAVING BANK LOAN | 5,652 | 76.79576 | 57.62705 | 434,050 | 325,708 |
| ... | ... | ... | ... | ... | ... | ... |

| DISPLAY FREQUENCY | SCORE |
|---|---|
| ONE TIME | 1 |
| TWO TIMES | 1 |
| THREE TIMES | 1.5 |
| FOUR TIMES | 2 |
| FIVE TIMES | 2.5 |
| SIX TIMES | 3 |
| SEVEN TIMES | 3.5 |
| EIGHT TIMES | 4 |
| NINE TIMES | 4.5 |
| TEN TIMES | 5 |

| RANKING | RANK SCORE |
|---------|------------|
| 1 | 20 |
| 2 | 19 |
| 3 | 18 |
| 4 | 17 |
| 5 | 16 |
| 6 | 15 |
| 7 | 14 |
| 8 | 13 |
| 9 | 12 |
| 10 | 11 |

| RANKING | RANK SCORE |
|---|---|
| 11 | 10 |
| 12 | 9 |
| 13 | 8 |
| 14 | 7 |
| 15 | 6 |
| 16 | 5 |
| 17 | 4 |
| 18 | 3 |
| 19 | 2 |
| 20 | 1 |

| RELATED KEYWORD | DISPLAY SCORE | RANKING | RANK SCORE |
|---|---|---|---|
| MORTGAGE | 1000 | 5 | 16 |
| DOCTOR LOAN | 900 | 7 | 14 |
| INTERNET CREDIT LOAN | 800 | 3 | 18 |
| INTERNET LOAN | 700 | 6 | 15 |
| LOAN COMPANY | 600 | 19 | 3 |
| SMALL LOAN | 500 | 8 | 13 |
| FAST LOAN | 400 | 4 | 17 |
| LOAN COUNSEL | 300 | 1 | 20 |
| SAVING BANK LOAN | 200 | 9 | 12 |
| ... | ... | ... | ... |

| DISPLAY SEQUENCE | RECOMMENDED KEYWORD |
|---|---|
| 1 | LOAN COUNSEL |
| 2 | INTERNET CREDIT LOAN |
| 3 | FAST LOAN |
| 4 | MORTGAGE |
| 5 | INTERNET LOAN |

SYSTEM AND METHOD FOR SUGGESTING RECOMMENDED KEYWORD

CROSS-REFERENCE TO RELATED APPLICATION

This application claims priority from and the benefit of Korean Patent Application No. 10-2010-0111923, filed on Nov. 11, 2010, which is hereby incorporated by reference for all purposes as if fully set forth herein.

BACKGROUND

1. Technical Field

Exemplary embodiments of the present invention relate to a system and method of suggesting recommended keywords.

2. Discussion of the Background

One possible way of providing search terms associated with an input search word, a keyword, or a query by a user is to provide, as related search words of the input search word, search words that are frequently input by users after the input search word is entered by the users.

Another possible way is to provide, as related search words, words highly associated with a search word that has been entered by a user, by measuring a degree of association between words by using existing documents on the Web, such as a webpage, and the like, and by associating and storing words highly associated with a certain word.

However, the first method simply displays search words that have been most frequently pursued, after the certain search word is entered, to show a search pattern of the users. The second method simply provides search words having high degree of association with the input search word based on the degree of association between words, and accordingly it is difficult to recommend keywords associated with keywords input by the users in relation to a business-related area.

That is, while it is possible to increase a convenience of the users performing a search, there is a problem in that it is difficult to increase an advertising effect of an advertiser or revenue from advertisement of a publisher.

Hereinafter, a system and method for effectively suggesting a set of recommended keywords will be provided.

SUMMARY

Exemplary embodiments of the present invention provide a system and method of suggesting at least one recommended keyword, which may extract keywords associated with a certain keyword in a business-related area from a related search word database, and may provide recommended keywords determined based on display scores each indicating an expected return of each of the extracted keywords, thereby increasing a search convenience of a user, and revenue from advertisement of a publisher or an advertising effect of an advertiser.

Exemplary embodiments of the present invention also provide a system and method of suggesting at least one recommended keyword, which may extract keywords associated with a certain keyword using data collected through a related search word database during a unit period, for example, for two weeks, thereby eliminating the possibility of a keyword abuse intensively occurring during a short period.

Exemplary embodiments of the present invention also provide a system and method of suggesting at least one recommended keyword, which may calculate a display score based on a Pay Per Click (PPC) value of each extracted keyword and a Click Through Ratio (CTR) of each advertisement region, or may calculate the display score based on the PPC value of each extracted keyword, and a click share corresponding to a ratio of the number of clicks occurring in an advertisement region where advertisements corresponding to a corresponding keyword are displayed, to the total number of clicks occurring in a unified search for the corresponding keyword, thereby reflecting an expected return of each extracted keyword in the display score.

Exemplary embodiments of the present invention also provide a system and method of suggesting at least one recommended keyword, which may calculate a display score based on a CTR of an advertisement region instead of a CTR of a certain advertisement, or a click share corresponding to a ratio of the number of clicks occurring in an advertisement region to the total number of clicks, thereby resolving a problem of keyword abuse associated with the certain advertisement.

Exemplary embodiments of the present invention also provide a system and method of suggesting at least one recommended keyword, which may apply, to a display score, a weight according to a display frequency, thereby resolving a problem of keyword abuse associated with a certain advertisement.

Exemplary embodiments of the present invention also provide a system and method of suggesting at least one recommended keyword, which may determine a recommended keyword further based on a rank score, assigned based on rankings of related search words associated with a certain keyword in a related search word database, in addition to a display score, thereby restricting a rapid change in the recommended keyword for each unit period based on display scores of keywords.

Additional features of the invention will be set forth in the description which follows, and in part will be apparent from the description, or may be learned by practice of the invention.

An exemplary embodiment of the present invention discloses a recommended keyword suggestion system including a database storage device, the system including a keyword extracting unit to extract at least one keyword associated with a certain keyword from a related search word database stored in the database storage device, a display score providing unit to provide at least one display score for the at least one extracted keyword, each of the at least one display score being associated with an expected revenue from advertisement of each of the at least one extracted keyword, and a recommended keyword determining unit to determine at least one recommended keyword to be displayed for the certain keyword among the at least one extracted keyword, based on the provided at least one display score.

Another exemplary embodiment of the present invention discloses a method for suggesting at least one recommended keyword using a related search word database that stores related search words associated with a certain keyword, the method including extracting at least one keyword associated with the certain keyword from the related search word database, providing at least one display score for the at least one extracted keyword, each of the at least one display score being associated with an expected revenue from advertisement of each of the at least one extracted keyword, and determining at least one recommended keyword to be displayed for the certain keyword among the at least one extracted keyword, based on the provided display score.

Yet another exemplary embodiment of the present invention discloses a method for providing one or more recommended keywords, the method including receiving a search term from a user, obtaining one or more candidate keywords associated with the search term from a related search word database, calculating an index for each of the one or more candidate keywords, the one or more indices being related to corresponding prospective monetary returns that are expected from advertisement of the corresponding one or more candidate keywords, and providing all or some of the one or more candidate keywords to the user for display.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and along with the description serve to explain the principles of the invention.

FIG. 6 is a table that illustrates calculated display scores according to exemplary embodiment of the present invention.

FIG. 7 is a table that illustrates scores according to display frequencies according to an exemplary embodiment of the present invention.

FIGS. 8A and 8B are tables that illustrate rank scores based on rankings according to an exemplary embodiment of the present invention.

FIGS. 9A and 9B are tables that illustrate a method of determining at least one recommended keyword based on a display score and a rank score according to an exemplary embodiment of the present invention.

DETAILED DESCRIPTION OF THE ILLUSTRATED EMBODIMENTS

Figure 1:
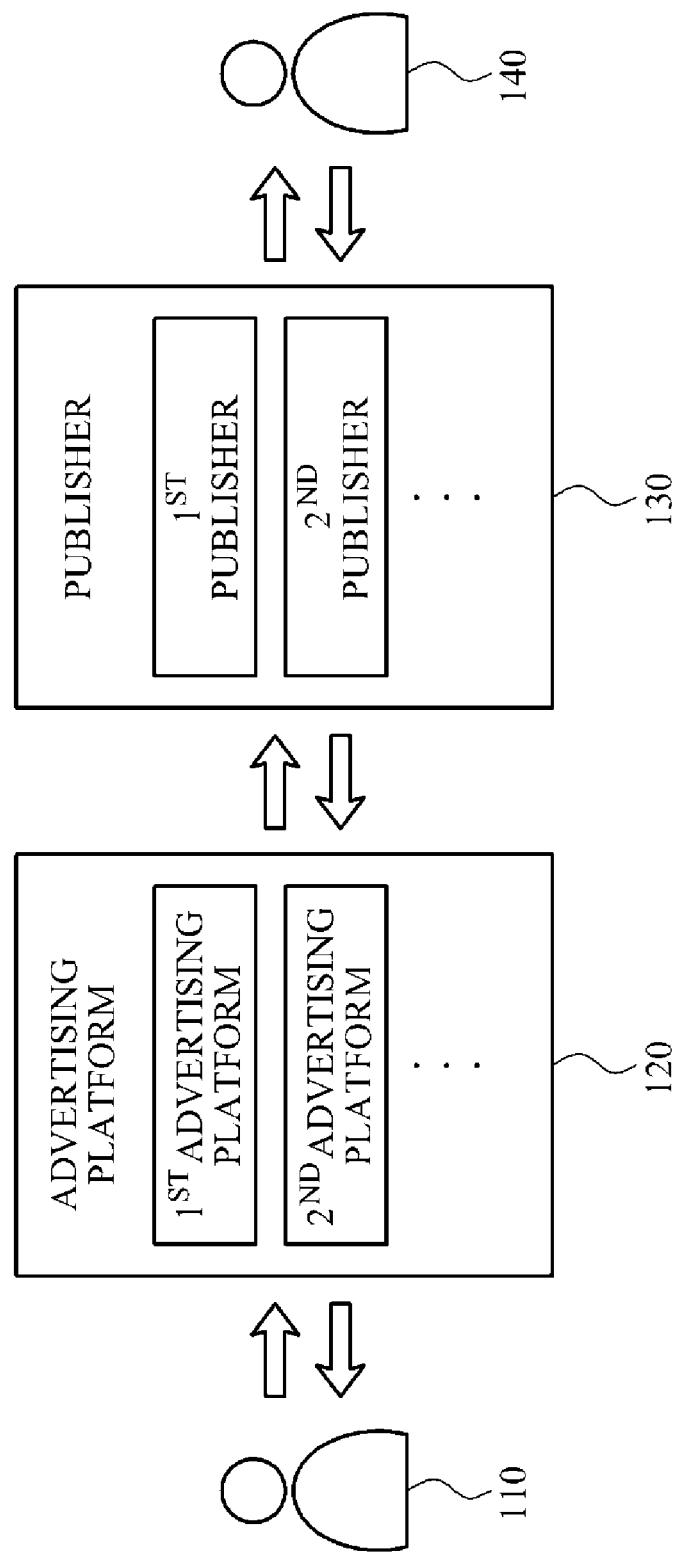
FIG. 1 is a diagram that illustrates a relationship between an advertiser, an advertising platform, a publisher, and a user according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It should be understood that any element, operation or command described herein is not to be construed as being an essential or principle feature of the present disclosure unless otherwise explicitly described. As used herein, the singular forms "a", "an" and "the" are intended to include the plural forms as well unless otherwise indicated. If only a single item is intended, the term "one" or similar terms will be used herein. Throughout the drawings and the detailed description, unless otherwise described, the same drawing reference numerals are understood to refer to the same elements, features, and structures. The relative size and depiction of these elements may be exaggerated for clarity, illustration, and convenience.

It will be understood that when an element is referred to as being "connected to" another element, it can be directly connected to the other element, or intervening elements may be present.

FIG. 1 is a diagram that illustrates a relationship between an advertiser, an advertising platform, a publisher, and a user according to an exemplary embodiment of the present invention. FIG. 1 illustrates an advertiser 110, an advertising platform 120, a publisher 130, and a user 140. Here, the advertiser 110 and the user 120 may also refer to terminals used by the advertiser 110 or the user 140 respectively, for example, a personal computer (PC), a smart phone, and the like. Accordingly, arrows in FIG. 1 may indicate that data are transmitted and received between a terminal used by the advertiser 110, the advertising platform 120, the publisher 130, and a terminal used by the user 140, via a wired and wireless network.

The advertising platform 120 may handle the bidding process for an advertisement by the advertiser 110, matching of an advertisement and a keyword, arranging advertisements or advertisers, providing an advertisement to the publisher 130, charging for showing or displaying an advertisement, and the like. General and technical details about the advertising platform 120 will be omitted herein for conciseness since such specific details may be understood by referring to conventional technologies on platforms for a banner advertisement and/or a search advertisement communicated via the Internet.

Here, the term "publisher" can be interchangeably used with the term "site." However, using the term "site" in a relevant description does not exclude a possibility that the present invention may be implemented in a non-conventional environment such as an application screen executed in a mobile terminal, and the like, which does not involve accessing a website using a PC. Conversely, the term "site" can be interchangeably used with the term "publishing site" or the aforementioned term "publisher." That is, each site may be an individual publisher. In an exemplary embodiment, the term "site" may refer to all types of websites on which an advertisement may be displayed to a user via a wired and wireless network. The term "site" may also refer to a single web page constituting a website.

The term "display" of an advertisement should be construed broadly to cover the activities of providing a visitor with a corresponding site, promotional contents such as a text associated with the advertiser, an image, a sound, a video, a hyperlink, and the like, through a site or a publisher. The term "selection" of a displayed advertisement may indicate a user's reaction (e.g., a reaction of a visitor to a site) to the promotional content such as a provided text, an image, and the like, by clicking, e.g., a mouse, to trigger an occurrence of a situation which an advertiser has intended through the promotional content. In an exemplary embodiment, the situation that the advertiser has intended may include, for example, displaying a page associated with the advertiser to the user who has selected the advertisement.

The publisher 130 may provide its own site to the user 140, and may provide pages included in the site through the site, or may provide a search result for a keyword to the user 140. In an exemplary embodiment, the publisher 130 may receive advertisements to be displayed through pages from the advertising platform 120, and may provide the advertisements to the user 140. Also, the publisher 130 may deliver the keyword input by the user 140 to the advertising platform 120, and may receive the advertisement from the advertising platform 120 and provide the user 140 with the advertisement associated with the keyword as a search result.

The publisher 130 may provide the user 140 with a path, for example, a screen, on an advertisement may be provided directly. In typical online environments, advertisements may be provided through websites. Here, each of a plurality of individual advertising sub-platforms, for example, a first advertising sub-platform, a second advertising sub-platform, and so on, included in the advertising platform 120 may display an advertisement through at least one of a plurality of individual publishers, for example, a first publisher, a second publisher, and so on. Each of the plurality of individual publishers may provide the user 140 with at least one of various services which are available via a wired and wireless network, for example, displaying the above-described advertisement through at least one site, a unified search, a keyword search, a blog service, and the like.

According to an exemplary embodiment of the present invention, a recommended keyword suggestion system may be one of the systems operating on an individual advertising platform, or a system included in one of the systems operating on the individual platform. In an exemplary embodiment, the recommended keyword suggestion system may receive information associated with the user 140 from at least one of the systems associated with an individual publisher, and use such information. Here, the information associated with the user 140 may be, for example, information on a recommended keyword selected by the user 140 from recommended keywords provided to the user 140 through the publisher 130.

According to another exemplary embodiment of the present invention, the recommended keyword suggestion system may be one of the systems associated with an individual publisher, or a system included in one of the systems associated with the individual publisher. In an exemplary embodiment, the recommended keyword suggestion system may receive information associated with the advertiser 110 from at least one of the systems operating on an individual advertising platform and use the information. Here, the information associated with the advertiser 110 may be, for example, information about a Pay Per Click (PPC) value of a certain keyword.

That is, the recommended keyword providing system may receive an input of related information directly from the advertiser 110 or the user 140, and may also receive the related information through at least one of a corresponding advertising platform and a corresponding publisher. However, the recommended keyword suggestion system and method will be described later, omitting descriptions regarding the relations with the advertising platform or the publisher, for ease of description.

Figure 2:
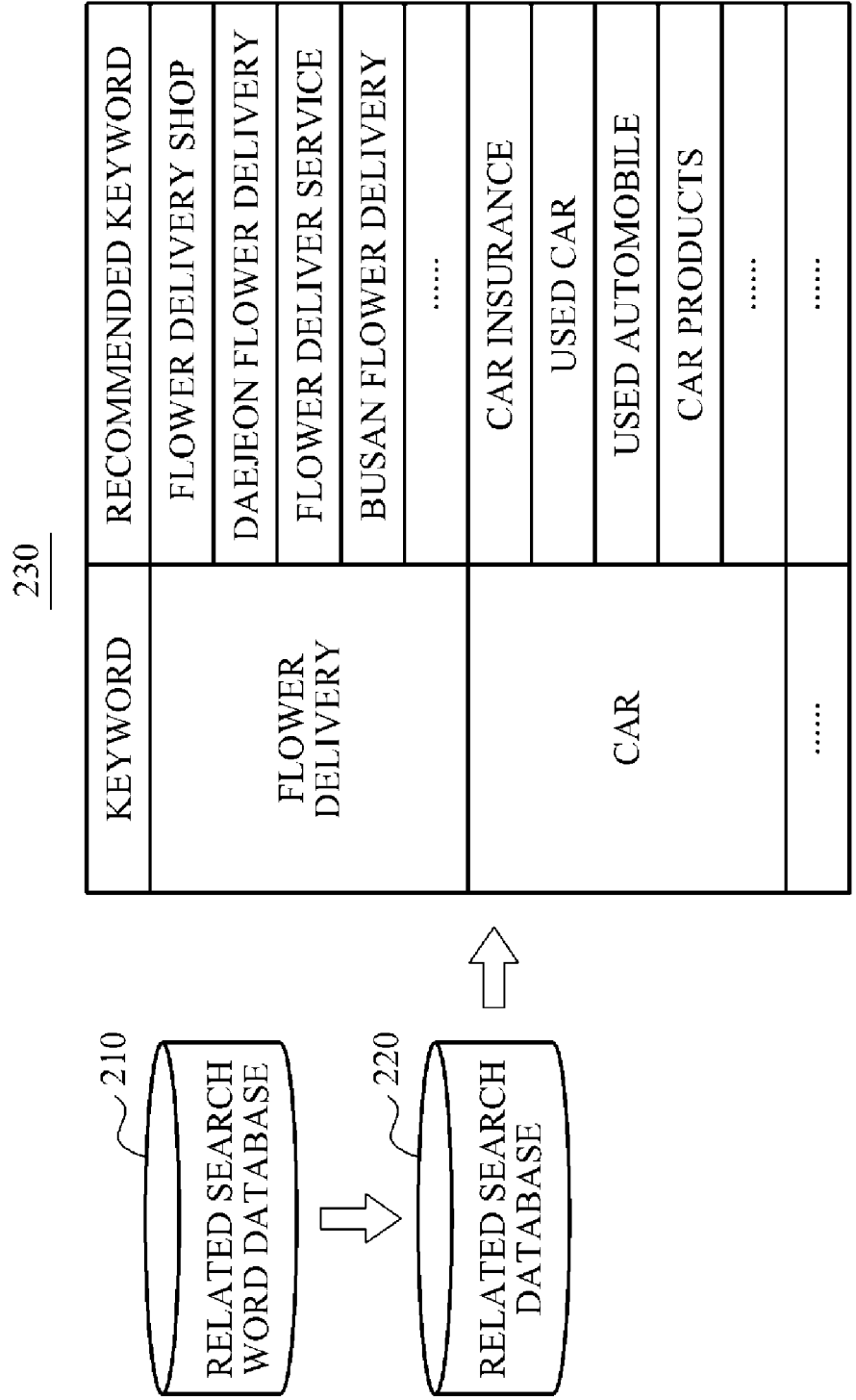
FIG. 2 is a diagram that illustrates a process of determining recommended keywords by a recommended keyword suggestion system according to an exemplary embodiment of the present invention.

FIG. 2 is a diagram that illustrates a process of determining at least one recommended keyword in a recommended keyword suggestion system according to an exemplary embodiment of the present invention. The recommended keyword suggestion system may use a related search word database 210 to determine at least one recommended keyword.

The related search word database 210 may refer to a data set that stores a search word, and search words associated with the search word, or a storage medium storing the data set.

In an exemplary embodiment, the recommended keyword suggestion system may extract keywords associated with a certain keyword from the related search word database 210, and may assign a display score to each of the extracted keywords. The recommended keyword suggestion system may also determine, based on the assigned display score, at least one of the extracted keywords as recommended keywords, and may provide the recommended keywords.

In the exemplary embodiment, the association between the search words stored in the related search word database 210 may be changed throughout a specific period of time. If the period of time is too short, an abuse may occur during the short period of time. Accordingly, in order to prevent the possibility of an abuse and to reflect the association between the search words that has been changed throughout the specific period of time, the recommended keyword suggestion system may provide, at every unit period, for example, every two weeks, a recommended keyword using data accumulated in the related search word database 210 during the previous unit period.

For example, the recommended keyword suggestion system may generate or update, at every unit period, for example, every two weeks, the related search database 220 including data accumulated in the related search word database 210 during the previous unit period. When an amount of the data collected during the previous unit period is insufficient, the recommended keyword suggestion system may generate or update the related search database 220 to include data collected during the next unit period.

When the related search database 220 has been generated or updated, the recommended keyword suggestion system may extract keywords stored in association with the corresponding keyword, for every keyword stored in the related search database 220, and may calculate display scores of the extracted keywords. The recommended keyword suggestion system may determine recommended keywords based on the display scores of the extracted keywords. A table 230 illustrates an example of recommended keywords determined by the recommended keyword suggestion system, among the keywords extracted in association with certain keywords "flower delivery" and "car."

A method of calculating a display score and a method of determining at least one recommended keyword based on the display score will be further described in detail.

Figure 3:
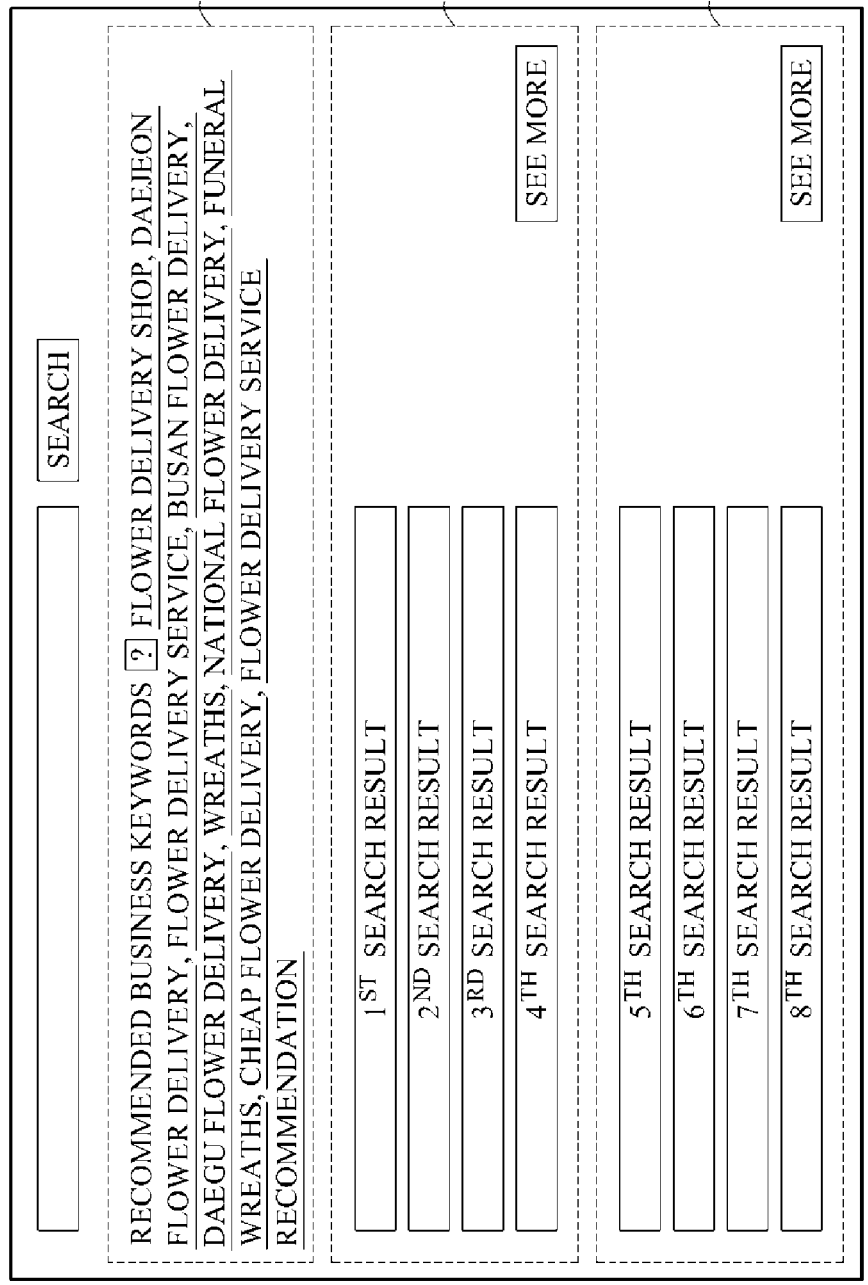
FIG. 3 is a diagram that illustrates a search result page showing at least one recommended keyword according to an exemplary embodiment of the present invention.

FIG. 3 is a diagram that illustrates a search result page showing at least one recommended keyword according to an exemplary embodiment of the present invention. As described with reference to FIG. 2, the recommended keyword suggestion system may determine recommended keywords for a keyword, and may provide the recommended keywords to a user who has entered the certain keyword. A box 300 illustrates an example of a screen display that shows a search result for the input keyword, a search term "flower delivery." When the user inputs the keyword "flower delivery," a search result for the term "flower delivery" may be provided to the user, as illustrated in a first dotted-lined box 310 and a second dotted-lined box 320. In an exemplary embodiment, each of the first dotted-lined box 310 and the second dotted-lined box 320 may respectively indicate a single region. If the region corresponding to the first dotted-lined box 310 is a region on which advertisements are displayed as the search result, the region of the first dotted-lined box 310 may be referred to as an "advertisement region."

A third dotted-lined box 330 illustrates recommended keywords for the keyword "flower delivery," determined to be displayed during the current unit period. That is, it is possible that "recommended business keywords" illustrated in FIG. 3 are not keywords simply associated with the keyword "flower delivery." Instead, the "recommended business keywords" may be, among the keywords associated with the keyword "flower delivery," recommended keywords that may be selected and recommended based on their respective display scores each of which may indicate expected return or revenue for the respective keywords associated with "flower delivery."

When the user inputs a keyword associated with a business area, a set of keywords may be recommended based on their respective expected returns. Through this configuration, facilitation of more convenient search is possible, the effects of conducting advertisements may be enhanced, and the revenue from the advertisement may increase.

Here, the keyword associated with the business area may include, for example, a keyword purchased by advertisers.

Figure 4:
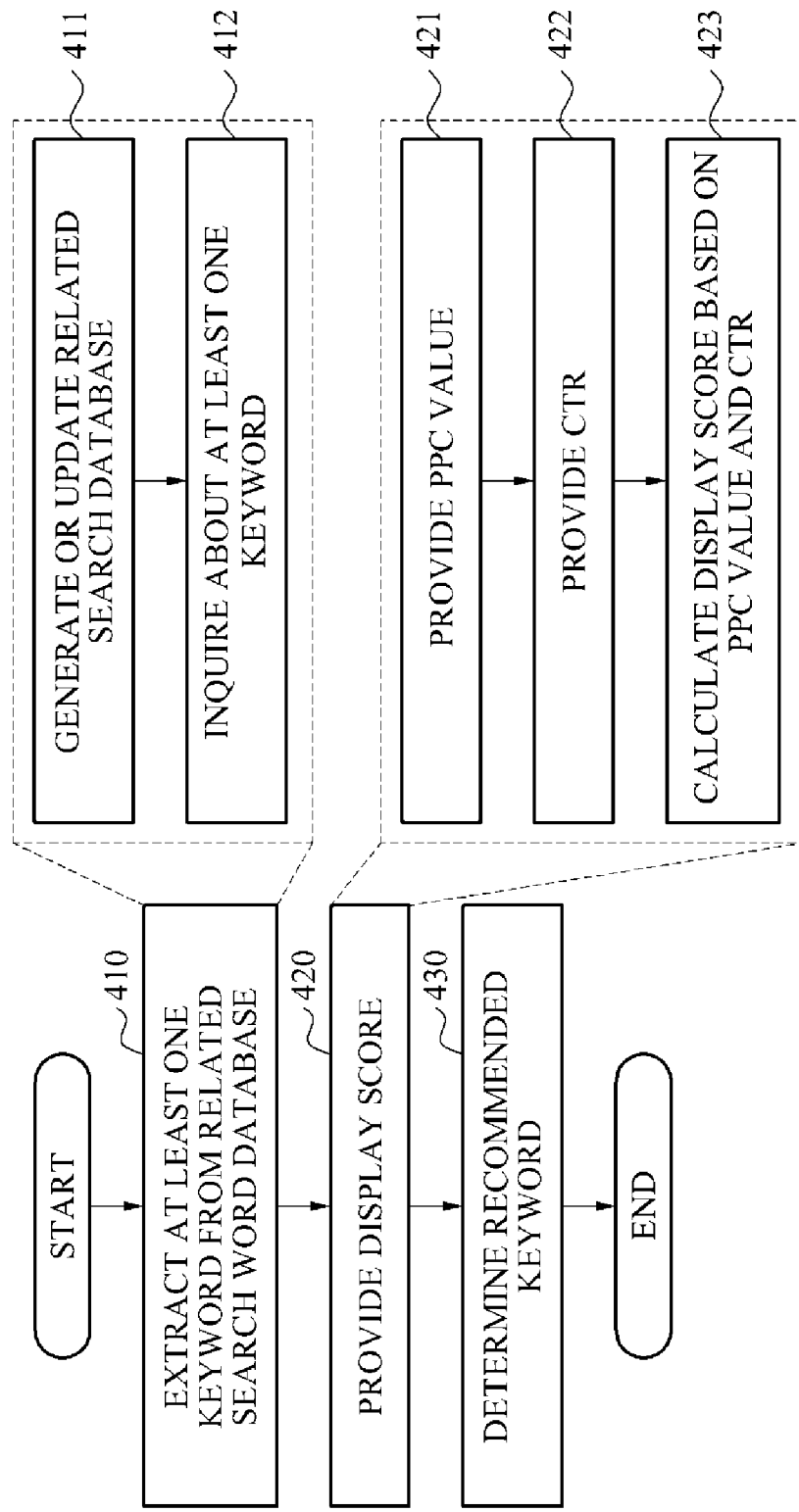
FIG. 4 is a flowchart that illustrates a method of suggesting at least one recommended keyword according to an exemplary embodiment of the present invention.

FIG. 4 is a flowchart that illustrates a method of suggesting at least one recommended keyword according to an exemplary embodiment of the present invention. The method of suggesting recommended keywords may be performed by the recommended keyword suggestion system described with reference to FIGS. 1 through 3. With reference to FIG. 4, the method of suggesting recommended keywords will be described by describing a process of performing each operation by the recommended keyword suggestion system.

In operation 410, the recommended keyword suggestion system may extract at least one keyword associated with a certain keyword from the related search word database. That is, the recommended keyword suggestion system may extract keywords associated with a certain keyword using a search word and related search words of the search word stored in the related search word database.

Here, search words that a user enters after the user's previous entry of a certain search word, or search words that a user enters after the user's previous entry of a certain search word and a subsequent visit to a certain Uniform Resource Locator (URL) may be determined to be the related search words associated with the certain search word. The certain search word and the related search words may be stored in association with each other, in the related search word database. Also, synonyms in one or more dictionaries, or words frequently included in the same documents may be associated with the certain search word as related search words, and may be stored in the related search word database. Accordingly, as described above, an association between the search words stored in the related search word database may be changed throughout a specific period of time. If the period of time is too short, an abuse may occur during the short period of time.

Therefore, in order to eliminate the abuse and reflect the association between the search words, the recommended keyword suggestion system may generate or update, at every unit period, for example, every two weeks, the related search database using data accumulated in the related search word database during the previous unit period, and may extract keywords associated with the certain keyword from the related search database. The recommended keyword suggestion system may perform operation 410 by incorporating operations 411 and 412 into operation 410.

In operation 411, the recommended keyword suggestion system may generate or update, at every unit period, the related search database using data accumulated in the related is search word database during the previous unit period. For example, the recommended keyword suggestion system may generate the related search database at every unit period by receiving, from the related search word database, the data accumulated during the previous unit period. Here, the unit period may be two weeks, ten days of the two weeks, or from Monday to Friday excluding Saturday and Sunday. If the related search database has already been generated, the recommended keyword suggestion system may update the related search database. For example, throughout a day, the data accumulated in the related search word database may include certain search words entered by users from 10:00 p.m. of the previous day to 10:00 p.m. of the current day, and related search words of the certain search words, the related search words being key words entered by users after the users input the certain search words. That is, the recommended keyword suggestion system may receive, from the related search word database, the data accumulated during the previous unit period among the data accumulated as described in the above-described example, and may generate or update the related search database using the received data. Also, the recommended keyword suggestion system may generate or update the related search database further using data accumulated during the next unit period when the amount of the data accumulated during the unit period is insufficient.

In operation 412, the recommended keyword suggestion system may inquire about at least one keyword associated with the certain keyword in the related search database. That is, the recommended keyword suggestion system may extract, from the related search database, keywords stored in association with the certain keyword during the unit period.

In operation 420, the recommended keyword suggestion system may provide a display score which may indicate an expected return or revenue of each of the extracted keywords. Here, the display score may be used as a criterion for selecting a recommended keyword for the keyword entered by the user in relation to the relevant business area. That is, the display score may be calculated based on indicators associated with the revenues of the keywords, for example, revenue from advertisement. In the exemplary method of suggesting recommended keywords of the present invention, operations 421 through 423 may be included in operation 420. A method for providing the display score in the another exemplary method of suggesting recommended keywords of the present invention will be further described in detail with reference to FIG. 5.

In operation 421, the recommended keyword suggestion system may provide a PPC value of each of the extracted keywords. Here, a PPC value of a keyword may be calculated as a sum of PPC values of advertisements displayed through a corresponding keyword, or an average of PPC values of the advertisements. For example, when PPC values of advertisements E, F, G, and H of advertisers B, C, and D who purchased a keyword A are "200 won," "250 won," "300 won," and "150 won," respectively, a PPC value of the keyword A may be calculated as 900 won which is the sum of the PPC values of the advertisements, or as "225 won" which is the average of the PPC values of the advertisements. The display scores used to determine the recommended keywords may be relative values of the keywords. Accordingly, any specific method, i.e., either the method using the sum of the PPC values or the method using the average of the PPC values, may be used so long as the same determination scheme is used to calculate the display score for all of the keywords.

Also, although the display scores may be calculated based on the PPC values as described above, a search word that has never been advertised, and thus has a PPC value of "0", may also be included as a recommended keyword since a database from which the recommended keyword may be extracted corresponds to the related search word database.

In operation 422, the recommended keyword suggestion system may provide a click through ratio (CTR) of an advertisement region where advertisements corresponding to each of the extracted keywords are displayed. In other words, the recommended keyword suggestion system may provide a CTR of an advertisement region where the advertisements are displayed through the corresponding keyword, rather than a CTR of each of the advertisements corresponding to the keyword, that is, the advertisements of advertisers who have purchased the keyword. The CTR of the advertisement region may be calculated based on a ratio of the number of clicks occurring in a region where the advertisements are displayed through the keyword, to the number of times that the advertisement region are displayed to the users. Here, a click may indicate a user's selection of the advertisement. For example, the CTR of the advertisement may be calculated according to Equation 1.

CTR of Advertisement Region=Number of Clicks of Advertisement Region/Number of Hits×100 [Equation 1]

Here, the number of hits denotes the number of times that the advertisement region is displayed to the users. The integer '100' may indicate that the CTR of the advertisement region is calculated as a percentage.

In operation 423, the recommended keyword suggestion system may calculate the display score of each of the extracted keywords based on its PPC value and CTR. For example, the recommended keyword suggestion system may calculate the display score according to Equation 2.

Display Score=PPC×CTR [Equation 2]

In Equation 2, the display score may denote the expected return or revenue of the is displayed keyword per a click. Here, a PPC value of a keyword may be used as the PPC value in the manner mentioned above. However, as another example, the PPC value of each advertisement may also be used as the PPC value. In this example, display scores may be calculated for each advertisement according to Equation 2. The display scores of advertisements corresponding to a corresponding keyword may be summed up, and a resulting score may be used as a final display score of the keyword.

Also, the recommended keyword suggestion system may calculate the display score based on a display frequency of each of the extracted keywords. The display score calculated according to Equation 2 may indicate an expected return per a click. Although the PPC value may be fixed, the CTR may cause an occurrence of an abuse. Accordingly, by applying weights based on the display frequencies to the display scores, the recommended keyword suggestion system may reduce an influence of the CTR on the display scores, and accordingly may reduce an influence of an occurrence of an abuse in case an abuse does occur. In an exemplary embodiment, the display score may be calculated according to Equation 3.

Display Score=PPC×CTR×Display Frequency Score [Equation 3]

Here, the display frequency score denotes the weight according to the display frequency of the corresponding keyword. The display frequency score will be further described with reference to FIG. 7.

In operation 430, the recommended keyword suggestion system may determine at least one recommended keyword for the certain keyword among the extracted keywords, based on the provided respective display scores. As described in operation 420, each of the display scores may reflect an expected return of each keyword, and the recommended keyword suggestion system may determine keywords having higher display scores to be the recommended keywords.

In an exemplary embodiment, the at least one recommended keyword may be determined at every unit period based on the display scores provided at the every unit period. The recommended keywords determined to be displayed during the current unit period for a certain keyword may be provided to the users who have entered the certain keyword during the current unit period. A method of providing the recommended keywords has been already described with reference to FIG. 3 and the description will be omitted here for conciseness.

The determination by the recommended keyword suggestion system of the at least one recommended keyword to be displayed during the current unit period may be further based on the number of times that each of the recommended keywords provided to the users during the previous unit period have been actually selected by the users. That is, the recommended keyword suggestion system may determine recommended keywords, which are more frequently selected by the users from the recommended keywords provided to the users who entered the certain keyword, to be highly associated with the certain keyword. The determination by the recommended keyword suggestion system of the at least one recommended keyword to be displayed during the next unit period may be further based on the number of times that the recommended keywords provided to the users have been actually selected. For example, weights based on the number of times the recommended keywords provided to the users have been actually selected may be assigned to the display score. Also, the recommended keyword suggestion system may determine an order of displaying the recommended keywords determined based on the display scores, according to the number of times that the recommended keywords provided to the users have been actually selected.

The number of times that the recommended keywords have been actually selected by the users during the previous unit period, and the number of times that the recommended keywords have been actually selected by the users during the current unit period may also be used. For example, the order of displaying the recommended keywords that are displayed in the current unit period may be changed in real time depending on the number of times that each of the recommended keywords has been actually selected during the current unit period.

Also, another indicator may be used to determine the recommended keywords. For example, a rank score may be assigned to each of the extracted keywords. Here, the rank score may work as a certain weight value based on rankings of related search words associated with a keyword in the related search word database. A method of determining the recommended keywords based on the rank score will be described in more detail with reference to FIGS. 8A through 9B.

Figure 5:
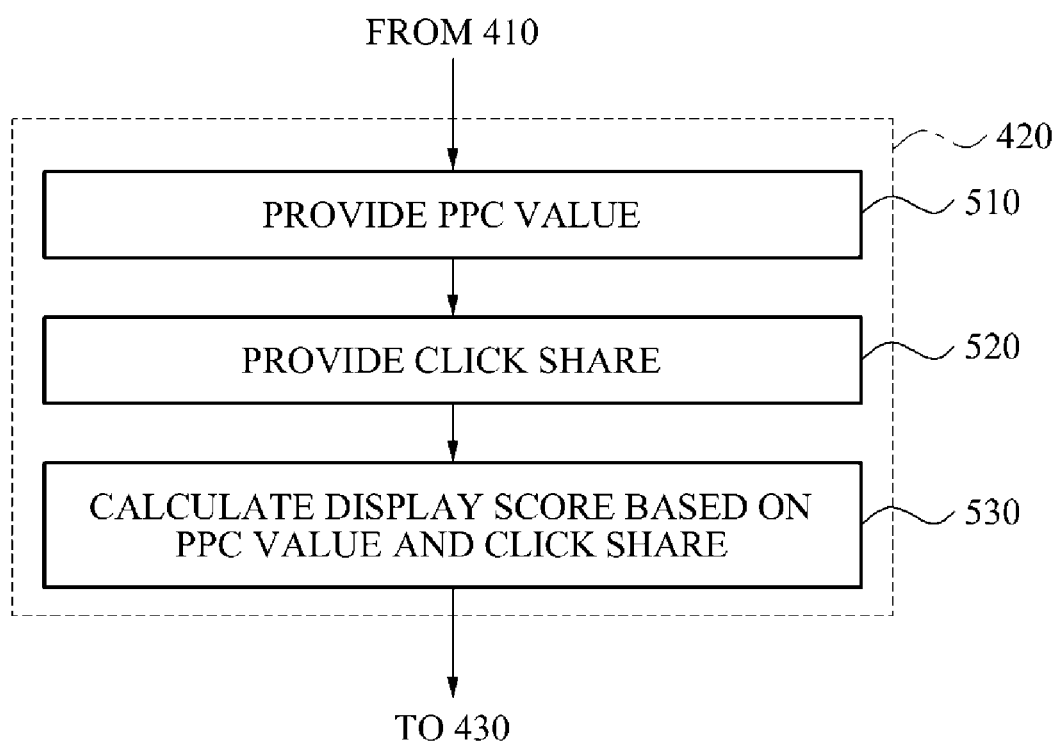
FIG. 5 is a flowchart that illustrates a method of providing a display score according to an exemplary embodiment of the present invention.

FIG. 5 is a flowchart that illustrates a method of providing a display score according to an exemplary embodiment of the present invention. Operations 510 through 530 illustrated in FIG. 5 may replace operations 421 through 423 described with reference to FIG. 4, and may be included in operation 420 of FIG. 4. That is, the display score may be calculated based on a PPC value of each of extracted keywords and a CTR of each advertisement region, in FIG. 4. However, in FIG. 5, the display score may be calculated based on a click share, instead of the CTR.

In operation 510, a recommended keyword suggestion system may provide a PPC value of each of the extracted keywords. Here, operation 510 may be identical to operation 421 described with reference to FIG. 4.

In operation 520, the recommended keyword suggestion system may provide a click share corresponding to a ratio of the number of clicks occurring in an advertisement region where advertisements are displayed, to the total number of clicks occurring in a unified search. For example, the click share may be calculated according to Equation 4.

Click Share=Number of Clicks Occurring in Advertisement Region/Total Number of Clicks of Corresponding Keyword×100 [Equation 4]

Here, the number of clicks occurring in the advertisement region denotes the number of clicks occurring in the advertisement region where the advertisements corresponding to the corresponding keyword are displayed. The total number of clicks of the corresponding keyword denotes the total number of clicks occurring in the unified search for each corresponding keyword. The integer '100' may indicate that the click share may be expressed as a percentage.

In operation 530, the recommended keyword suggestion system may calculate a display score of each of the extracted keywords based on the PPC value and the click share. In an exemplary embodiment, Equation 2 may be changed to Equation 5.

Display Score=PPC×Click Share [Equation 5]

Similar to Equation 3, a display frequency may also be reflected in the display score of Equation 5.

FIG. 6 is a table illustrating calculated display scores according to an exemplary is embodiment of the present invention. A table 600 indicates keywords extracted from the related search database in relation to a certain keyword "loan", and indicators of the extracted keywords. In an exemplary embodiment, a result 1 may indicate a display score calculated based on a PPC value and a CTR of an advertisement region as expressed by Equation 2. Also, a result 2 may indicate a display score calculated based on a PPC value and a click share as expressed by Equation 5. As described above, a weight according to a display frequency or a weight according to the number of times that a recommended keyword that is displayed has been actually selected by a user may be assigned to the display score.

When the display scores of each of the keywords are calculated, a recommended keyword suggestion system may arrange each of the keywords based on the display scores, and may determine, among the arranged keywords, keywords corresponding to a certain number to be the recommended keywords.

FIG. 7 is a table illustrating scores corresponding to display frequencies according to an exemplary embodiment of the present invention. A table 700 indicates examples of display frequency scores calculated based on display frequencies. That is, by assigning, to a display score, a higher display frequency score as a weight when a display frequency is higher, a recommended keyword suggestion system may reduce an effect of a CTR or a click share on the display score, and accordingly may reduce an effect according to abuse occurrence when abuse occurs.

FIGS. 8A and 8B are tables illustrating rank scores based on rankings according to an exemplary embodiment of the present invention. A table 810 of FIG. 8A indicates rank scores of keywords corresponding to a first ranking through a tenth ranking. A table 820 of FIG. 8B indicates rank scores of keywords corresponding to an eleventh ranking through a twentieth is ranking.

As described above, a recommended keyword suggestion system may determine a recommended keyword further based on a rank score as well as a display score. As an example, the recommended keyword suggestion system may primarily arrange keywords extracted from the related search database in a descending order of display scores, and then may secondarily arrange the keywords in a descending order of rank scores. The recommended keyword suggestion system may extract top N keywords from the arranged keywords, and may determine the N keywords to be recommended keywords. As another example, the recommended keyword suggestion system may extract top M keywords by primarily arranging keywords extracted from the related search database in a descending order of display scores, and may extract top N keywords by secondarily arranging the extracted M keywords based on rank scores, thereby determining the N keywords to be recommended keywords.

In addition, the recommended keywords determined by the recommended keyword suggestion system may be monitored, as necessary.

FIGS. 9A and 9B are tables illustrating a method of determining a recommended keyword based on a display score and a rank score according to an exemplary embodiment of the present invention. A table 910 of FIG. 9A indicates an example in which keywords associated with a certain keyword "loan" may be primarily arranged based on calculated display scores. A dotted-lined box 911 may indicate that top eight keywords may be determined based on the display scores. The table 910 also indicates rankings of each of the related keywords associated with the certain keyword "loan" in the related search word database, and rank scores according to the rankings. A table 920 of FIG. 9B indicates an example in which the eight determined keywords may be secondarily arranged based on the rank scores, and then top five keywords may be determined to be recommended keywords.

As an example of FIGS. 9A and 9B, a recommended keyword suggestion system may extract M keywords by primarily arranging the related keywords based on the display scores, and may extract N keywords by secondarily arranging the extracted M keywords based on the rank scores, thereby determining the N keywords to be recommended keywords. However, as another example, the recommended keyword suggestion system may primarily arrange the related keywords based on the display scores, and then may secondarily arrange the keywords based on the rank scores, thereby extracting keywords corresponding to a needed number, and determining the extracted keywords to be recommended keywords. In the example of FIGS. 9A and 9B, a keyword "loan counsel" may be ranked eighth when the related keywords are primarily arranged based on the display scores. However, the keyword "loan counsel" may be ranked first when the related keywords are secondarily arranged based on the rank scores, and may be determined to be a recommended keyword.

Figure 10:
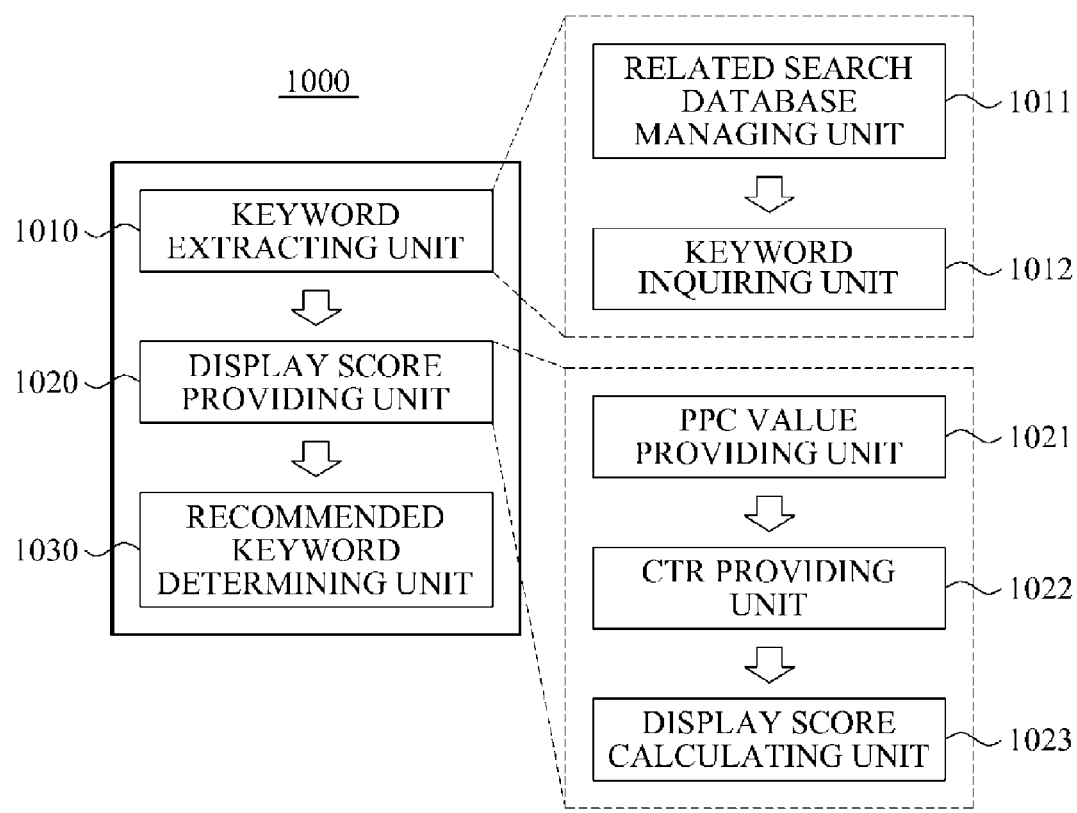
FIG. 10 is a block diagram that illustrates a structural configuration of a recommended keyword suggestion system according to an exemplary embodiment of the present invention.

FIG. 10 is a block diagram that illustrates a structural configuration of a recommended keyword suggestion system according to an exemplary embodiment of the present invention. A system 1000 may be the recommended keyword suggestion system described with reference to FIGS. 1 through 9B. As illustrated in FIG. 10, the system 1000 may include a keyword extracting unit 1010, a display score providing unit 1020, and a recommended keyword determining unit 1030.

The keyword extracting unit 1010 may extract at least one keyword associated with a certain keyword from the related search word database. That is, the keyword extracting unit 1010 may extract keywords associated with a certain keyword using a search word and related search words of the search word stored in the related search word database.

Here, search words entered by users after the users input a certain search word, or search words entered by the users after the users input the certain search word and visited a certain URL may be determined to be related search words associated with the certain search word. The certain search word and the related search words may be stored in association with each other in the related search word database. Also, synonyms in one or more dictionaries, or words frequently included in the same documents may be associated with the certain search word as related search words, and may be stored in the related search word database. Accordingly, as described above, an association between the search words stored in the related search word database may be changed throughout a specific period of time. If the period of time is too short, an abuse may occur during the short period of time.

Accordingly, in order to prevent the possibility of an abuse and to reflect the association between the search words that has been changed throughout the specific period of time, the keyword extracting unit 1010 may generate or update, at every unit period, for example, every two weeks, the related search database using data accumulated in the related search word database during the previous unit period, and may extract keywords associated with the certain keyword from the related search database. Here, the keyword extracting unit 1010 may include the related search database managing unit 1011, and a keyword inquiring unit 1012.

The related search database managing unit 1011 may generate or update, at every unit period, the related search database using data accumulated in the related search word database during the previous unit period. For example, the related search database managing unit 1011 may generate the related search database at every unit period by receiving, from the related search word database, the data accumulated during the previous unit period. Here, the unit period may be two weeks, or ten days of the two weeks, from Monday to Friday excluding Saturday and Sunday. If the related search database has already been generated, the related search database managing unit 1011 may update the related search database. For example, throughout a day, the data accumulated in the related search word database may include a certain search word entered by users from 10:00 p.m. of a previous day before to 10:00 p.m. of the current day, and related search words of the certain search word, the related search words being search words entered by the users after the users input the certain search word. That is, the related search database managing unit 1011 may receive, from the related search word database, the data accumulated during the previous unit period among the data accumulated as described in the above-described example, and may generate or update the related search database using the received data. Also, the related search database managing unit 1011 may generate or update the related search database further using data accumulated during the next unit period when the amount of the data accumulated during the unit period is insufficient.

The keyword inquiring unit 1012 may inquire about at least one keyword associated with the certain keyword in the related search database. That is, the keyword inquiring unit 1012 may extract, from the related search database, keywords stored in association with the certain keyword during the unit period.

The display score providing unit 1020 may provide a display score which may indicate an expected return of each of the extracted keywords. Here, the display score may be used as a criterion for selecting a recommended keyword for the keyword entered by the user in relation to the relevant business area. That is, the display score may be calculated based on indicators associated with the revenues from advertisement of the keywords, for example, revenues from advertisement. Here, the display score providing unit 1020 may include a PPC value providing unit 1021, a CTR providing unit 1022, and a display score calculating unit 1023 as illustrated in FIG. 10.

The PPC value providing unit 1021 may provide a PPC value of each of the extracted keywords. Here, a PPC value of a keyword may be calculated as a sum of PPC values of advertisements displayed through a corresponding keyword, or an average of PPC values of the advertisements. For example, when PPC values of advertisements E, F, G, and H of advertisers B, C, and D who purchased a keyword A correspond to "200 won", "250 won", "300 won", and "150 won", respectively, a PPC value of the keyword A may be calculated as 900 won which is the sum of the PPC values of the advertisements, or as "225 won" which is the average of the PPC values of the advertisements. The display scores used to determine the recommended keywords may be relative values of the keywords. Accordingly, any specific method, i.e., either the method using the sum of the PPC values or the method using the average of the PPC values, may be used so long as the same determination scheme is used to calculate the display score for all of the keywords.

Also, although the display scores may be calculated based on the PPC values as described above, a search word that has never been advertised and accordingly has a PPC value of "0" may also be included as a recommended keyword since a database from which the recommended keyword may be extracted corresponds to the related search word database.

The CTR providing unit 1022 may provide a click through ratio (CTR) of an advertisement region where advertisements corresponding to each of the extracted keywords are displayed. That is, the CTR providing unit 1022 may provide a CTR of an advertisement region where the advertisements are displayed through the corresponding keyword, rather than a CTR of each of the advertisements corresponding to the keyword, that is, the advertisements of advertisers who have purchased the keyword. The CTR of the advertisement region may be calculated based on a ratio of the number of clicks occurring in a region where the advertisements are displayed through the keyword, to the number of times that the advertisement region are displayed to the users. Here, a click may indicate a user's selection of the advertisement. For example, the CTR of the advertisement may be calculated according to the above-described Equation 1.

The display score calculating unit 1023 may calculate the display score of each of the extracted keywords based on the PPC value and the CTR. For example, the display score calculating unit 1023 may calculate the display score according to the above-described Equation 2. Here, a PPC value of a keyword may be used as the PPC value of Equation 2 as mentioned above. However, as another example, the PPC value of each advertisement may also be used as the PPC value. In this example, display scores may be calculated for each advertisement according to Equation 2. The display scores of advertisements corresponding to the certain keyword may be summed up, and a resulting score may be used as a final display score of the keyword.

Also, the display score calculating unit 1023 may calculate the display score based on a display frequency of each of the extracted keywords. The display score calculated according to Equation 2 may indicate an expected return per click. Although the PPC value may be fixed, the CTR may cause an occurrence of an abuse. Accordingly, by applying weights based on the display frequencies to the display scores, the display score calculating unit 1023 may reduce an influence of the CTR on the display scores, and accordingly may reduce an influence of an occurrence of an abuse in case an abuse does occur. In an exemplary embodiment, the display score may be calculated as expressed by the according to Equation 3. A display frequency score has been described in detail and thus, a duplicated description will be omitted for conciseness.

As another example, the display score providing unit 1020 may include a click share providing unit (now shown) instead of, or in addition to, the CTR providing unit 1022. In an exemplary embodiment, the click share providing unit may provide a click share which corresponds to a ratio of the number of clicks occurring in an advertisement region where advertisements are displayed, to the total number of clicks occurring in a unified search. For example, the click share may be calculated according to the Equation 4. That is, the display score calculating unit 1023 may calculate a display score based on the click share, rather than a CTR. That is, the display score calculating unit 1023 may calculate a display score of each of the extracted keywords based on the PPC value and the click share. In an exemplary embodiment, Equation 2 may be changed to Equation 5.

The recommended keyword determining unit 1030 may determine at least one recommended keyword for the certain keyword among the extracted keywords, based on the provided respective display scores. As described above, each of the display score may reflect an expected return of each keyword, and the recommended keyword determining unit 1030 may determine keywords having higher display scores to be the at least one recommended keyword.

In an exemplary embodiment, the at least one recommended keyword may be determined at every unit period based on the display scores provided at the every unit period. The recommended keywords determined to be displayed during the current unit period for a certain keyword may be provided to the users who have entered the certain keyword during the current unit period. A method of providing the recommended keywords has been already described with reference to FIG. 3.

The determination by the recommended keyword determining unit 1030 of the at least one recommended keyword to be displayed during the current unit period may be further based on the number of times that each of the recommended keywords provided to the users during the previous unit period have been actually selected by the users. That is, the recommended keyword determining unit 1030 may determine recommended keywords, which are more frequently selected by the users from the recommended keywords provided to the users who entered a certain keyword, to be highly associated with the certain keyword. The determination by the recommended keyword determining unit 1030 of the at least one recommended keyword to be displayed during the next unit period may be further based on the number of times that the recommended keywords provided to the users have been actually selected. For example, weights based on the number of times the recommended keywords provided to the users have been actually selected may be assigned to the display score. Also, the recommended keyword determining unit 1030 may determine the order of displaying the recommended keywords determined based on the existing display scores, according to the number of times that the recommended keywords provided to the users have been actually selected.

The number of times that the recommended keywords have been actually selected by the users during the previous unit period, and the number of times that the recommended keywords have been actually selected by the users during the current unit period may also be used. For example, the order of displaying the recommended keywords that are displayed in the currently unit period may be changed in real time depending on the number of times that each of the recommended keywords has been actually selected during the current unit period.

Also, another indicator may be used to determine the recommended keywords. For example, a rank score may be assigned to each of the extracted keywords. Here, the rank score may work as a weight value based on rankings of related search words associated with a keyword in the related search word database. A method of determining the recommended keywords based on the rank score has been described with reference to FIGS. 8A through 9B and thus, a duplicated description will be omitted for conciseness.

FIGS. 1 through 9B may be referred to for omitted descriptions with reference to FIG. 10.

According to exemplary embodiments of the present invention, it is possible to facilitate a more convenient search by a user, increase revenues from advertisement of a publisher or an influence of advertisement by an advertiser, by extracting keywords associated with a keyword in a business-related area from the related search word database, and suggesting at least one recommended keyword determined based on respective display scores each indicating an expected return of each of extracted keyword. It is possible to prevent the possibility of an abuse, which intensively occurs during a short period, by generating or updating the related search database using data collected in the related search word database during a unit period, for example, for two weeks, and extracting keywords associated with a certain keyword from the related search database.

Also, it is possible to allow the display score to reflect the expected return of each extracted keyword by calculating the display scores based on a PPC value of each extracted keyword and a CTR of each advertisement region, or by calculating the display scores based on a PPC value of each extracted keyword, and a click share corresponding to a ratio of the number of clicks occurring in an advertisement region where advertisements corresponding to a corresponding keyword are displayed, to the total number of clicks occurring in a unified search for the corresponding keyword. It is possible to handle the problem of abusing a keyword associated with the certain advertisement, by calculating a display score based on a CTR of an advertisement region instead of a CTR of a certain advertisement, or a click share corresponding to a ratio of the number of clicks occurring in an advertisement region to the total number of clicks.

Also, it is possible to handle the problem of abusing a keyword associated with a certain advertisement, by applying, to a display score, a weight according to a display frequency, and restricting the display frequency and the weight according to the display frequency to be less than a certain value. It is possible to restrict a rapid change in the recommended keyword for each unit period based on display scores of keywords by determining the recommended keyword further based on a rank score, assigned based on rankings of related search words associated with a certain keyword in the related search word database, in addition to the display score.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A recommended keyword suggestion system in communication with a computer network for suggesting a keyword and performing a search in a plurality of computer servers in the computer network, the system comprising:
- a computer processor and a database storage device for storing data used or generated in the processor;
- a search result providing unit, in the processor, configured for displaying a first set of search results associated with a certain keyword input by a user at a website, each of the search results listing a site on the network directly accessible on the network by the user when the each of the search results is selected by the user;
- a keyword extracting unit, in the processor, configured to extract at least one keyword associated with the certain keyword from a related search word database in the database storage device;
- a display score providing unit, in the processor, configured to provide at least one display score for the at least one extracted keyword, each of the at least one display score being associated with an expected revenue from advertisement of each of the at least one extracted keyword on a website; and
- a recommended keyword determining unit, in the processor, configured to determine at least one recommended keyword from among the at least one extracted keyword to be displayed on a website in addition to the first set of search results, based on the provided at least one display score;
- wherein the at least one recommended keyword enables the search result providing unit to display a second set of search results related to one of the at least one recommended keyword when the one of the recommended keyword is selected by the user,
- wherein the display score providing unit comprises:
  - a Pay Per Click (PPC) value providing unit configured to provide a PPC value of each of the at least one extracted keyword;
  - a Click Through Ratio (CTR) providing unit configured to provide a CTR of an advertisement region of a website where advertisements corresponding to the at least one extracted keyword are displayed; and
  - a display score calculating unit configured to calculate the at least one display score of each of the at least one extracted keyword, based on the PPC value and the CTR, wherein the display score calculating unit calculates the at least one display score further based on a display frequency of the at least one extracted keyword for denoting a weight according to the display frequency, and the weight based on a number of times that the at least one recommended keyword has been actually selected by the user is assigned to the at least one display score.

2. The system of claim 1, wherein the keyword extracting unit comprises:
- a related search database managing unit, in the processor, configured to generate or update, at every unit period, a related search database using data accumulated in the related search word database during a previous unit period; and
- a keyword inquiring unit, in the processor, configured to inquire about at least one keyword associated with the certain keyword in the related search database.

3. The system of claim 1, wherein
- the at least one recommended keyword is determined at every unit period, based on the at least one display score provided at the every unit period, and
- the at least one recommended keyword determined to be displayed during a current unit period is provided to users who enter the certain keyword during the current unit period.

4. A computer-implemented method for suggesting at least one recommended keyword in a network search, using a computer processor in communication with a computer network and a related search word database that stores related search words associated with a certain keyword in a plurality of computer servers in the computer network, the method comprising executing the following steps by a computer:
- displaying a first set of search results associated with a certain keyword input by a user at a website, each of the search results listing a site on the network directly accessible on the network by the user when the each of the search results is selected by the user;
- extracting at least one keyword associated with the certain keyword from the related search word database in a database storage device;
- providing at least one display score for the at least one extracted keyword, each of the at least one display score being associated with an expected revenue from advertisement of each of the at least one extracted keyword on a website; and
- determining at least one recommended keyword from among the at least one extracted keyword to be displayed on a website in addition to the first set of search results, based on the provided at least one display score;
- wherein the at least one recommended keyword enables display of a second set of search results related to one of the at least one recommended keyword when the one of the recommended keyword is selected by the user; and
- wherein the providing of the at least one display score comprises:
  - providing a Pay Per Click (PPC) value of each of the at least one extracted keyword, and a Click Through Ratio (CTR) of an advertisement region of a website where advertisements corresponding to the at least one extracted keyword are displayed; and
  - calculating the at least one display score of each of the at least one extracted keyword, based on the PPC value and the CTR, wherein the at least one display score is calculated further based on a display frequency of the at least one extracted keyword for denoting a weight according to the display frequency, and the weight based on a number of times that the at least one recommended keyword has been actually selected by the user is assigned to the at least one display score.

5. The method of claim 4, wherein the extracting comprises:
- generating or updating, at every unit period, a related search database using data accumulated in the related search word database during a previous unit period; and
- inquiring about at least one keyword associated with the certain keyword in the related search database.

6. The method of claim 4, wherein
- the at least one recommended keyword is determined at every unit period, based on the at least one display score provided at the every unit period, and
- the at least one recommended keyword determined to be displayed during a current unit period is provided to users who entered the certain keyword during the current unit period.

7. A non-transitory computer-readable medium comprising a program which upon execution by a computer, causes the computer to execute a method comprising:

displaying a first set of search results associated with a certain keyword input by a user at a website, each of the search results listing a site on a network directly accessible on the network by the user when the each of the search results is selected by the user;

extracting at least one keyword associated with the certain keyword from the related search word database in a database storage device;

providing at least one display score for the at least one extracted keyword, each of the at least one display score being associated with an expected revenue from advertisement of each of the at least one extracted keyword on a website; and determining at least one recommended keyword from among the at least one extracted keyword to be displayed on a website in addition to the first set of search results, based on the provided at least one display score;

wherein the at least one recommended keyword enables display of a second set of search results related to one of the at least one recommended keyword when the one of the recommended keyword is selected by the user; and wherein the providing of the at least one display score comprises:

providing a Pay Per Click (PPC) value of each of the at least one extracted keyword, and a Click Through Ratio (CTR) of an advertisement region of a website where advertisements corresponding to the at least one extracted keyword are displayed; and calculating the at least one display score of each of the at least one extracted keyword, based on the PPC value and the CTR, wherein the at least one display score is calculated further based on a display frequency of the at least one extracted keyword for denoting a weight according to the display frequency, and the weight based on a number of times that the at least one recommended keyword has been actually selected by the user is assigned to the at least one display score.

* * * * *